Patented July 24, 1951

2,561,613

UNITED STATES PATENT OFFICE 2,561,613

CONDENSATION PRODUCTS OF UNSATURATED ETHER-ALDEHYDES, POLYMERS THEREOF, AND METHODS FOR PRODUCING THE SAME

Paul A. Devlin, San Francisco, Richard R. Whetstone, Albany, and Edward C. Shokal, Oakland, Calif., assignors to Shell Development Company, San Francisco, Calif., a corporation of Delaware No Drawing. Application February 14, 1949,
Serial No. 76,412

21 Claims. (Cl. 260—64)

This invention relates to a new class of condensation products and to the polymers and copolymers thereof. More particularly the invention relates to condensation products of carbonylic compounds and unsaturated ethers of aliphatic saturated aldehydes, to the polymers and copolymers thereof, and to methods for producing the same.

Specifically the invention provides a new and particularly useful class of condensation products which are prepared by reacting, in the presence of a condensation catalyst, saturated aldehydes or saturated ketones with saturated aliphatic aldehydes having one of their chain carbon atoms joined through an ether linkage to an unsaturated radical containing at least one olefinic double bond. The invention further provides novel polymers and copolymers of the above-described condensation products which are prepared by polymerizing the said condensation products with themselves or with polymerizable unsaturated organic compounds.

It is an object of the invention to provide a new and particularly useful class of condensation products of carbonylic compounds and unsaturated ether-aldehydes. It is a further object of the invention to provide condensation products of saturated aldehydes or saturated ketones and unsaturated ethers of saturated aldehydes. It is a further object of the invention to provide condensation products of saturated aldehydes or saturated ketones and unsaturated ether-aldehydes described above which possess many beneficial unexpected properties. It is a further object of the invention to provide novel polymers and copolymers of the above-described condensation products. It is a further object to provide polymers and copolymers of the above-described condensation products which possess many improved properties. It is a further object to provide a method for the production of valuable condensation products from the unsaturated ether-aldehydes described above. Other objects of the invention will be apparent from the detailed description given hereinafter.

It has now been discovered that valuable condensation products may be prepared by contacting, in the presence of a condensation catalyst, saturated aldehydes or saturated ketones with saturated aliphatic aldehydes having one of their chain carbon atoms joined through an ether linkage to an unsaturated radical containing at least one olefinic double bond. The resulting products possess many unusual properties and are capable of being used for many industrial purposes, such as plasticizers, tackifiers, textile lubricants, solvents, and the like. The products may also be polymerized with themselves or with other polymerizable unsaturated organic compounds to produce valuable polymeric products.

The unsaturated ethers of aliphatic saturated aldehydes which may be used to produce the novel condensation products of the invention comprise the saturated aliphatic aldehydes having one of their chain carbon atoms joined through an ether linkage to an unsaturated radical containing at least one olefinic double bond. Examples of these unsaturated ether-aldehydes are beta-allyloxypropionaldehyde, beta-methallyloxypropionaldehyde, beta-ethallyloxypropionaldehyde, gamma-methallyloxybutyraldehyde, gamma-chloroallyloxybutyraldehyde, gamma-ethallyloxyvaleraldehyde, gamma-methallyloxycaproaldehyde, beta-(3-butenyloxy)propionaldehyde, beta-(3-butenyloxy)valeraldehyde, beta-(3-hexenyloxy)butyraldehyde, beta-(3-chloro-3-pentenyloxy)propionaldehyde, gamma-(2-methyl-3-butenyloxy)valeraldehyde, gamma-(3-bromo-3-hexenyloxy)caproaldehyde, gamma-bromoallyloxyvaleraldehyde, and beta-ethallyloxybutyraldehyde.

A preferred group of unsaturated ethers of aliphatic saturated aldehydes to be used in producing the novel condensation products of the invention are those above-described unsaturated ether-aldehydes wherein the saturated aldehyde is an open-chain aldehyde and the unsaturated ether radical joined to the saturated aldehyde molecule is an open-chain aliphatic radical containing one olefinic double bond in a beta,gamma position to the ether linkage and is joined through the ether linkage to the beta carbon atom of the said saturated aldehyde. Examples of this preferred group of unsaturated ether-aldehydes are beta-allyloxypropionaldehyde, beta-allyloxyisobutyraldehyde, beta-ethallyloxypropionaldehyde, beta-(2-butenyloxy)propionaldehyde, beta-(2-pentenyloxy)valeraldehyde, beta(2-chloro-2-propenyloxy)propionaldehyde and beta-ethallyloxybutyraldehyde.

A particularly preferred group of unsaturated ethers of aliphatic saturated aldehydes to be used in producing the novel condensation products are the above-described preferred unsaturated ether-aldehydes wherein the saturated open-chain aldehydes contain from 3 to 8 carbon atoms, and the unsaturated radical joined to the aldehyde molecule is a beta,gamma-unsaturated alkenyl radical possessing a terminal methylene group and containing from 3 to 6 carbon atoms. Examples of this particularly preferred group of unsaturated ether-aldehydes are beta-allyloxypropionaldehyde, beta-methallyloxypropionaldehyde, beta-ethallyloxyvaleraldehyde, beta-(2-ethyl-2-propenyloxy)butyraldehyde, beta-ethallyloxycaproaldehyde, beta-(2-propyl-2-propenyloxy)caproaldehyde, and beta-ethallyloxybutyraldehyde.

The above-described unsaturated ether-aldehydes may be produced by any suitable method. They are preferably prepared by reacting an aliphatic monoolefinic unsaturated aldehyde with the desired unsaturated alcohol in the presence of a condensation catalyst. Beta-allyloxypropionaldehyde may be prepared by this method, for example, by condensing acrolein with allyl alcohol. Examples of aliphatic monoolefinic unsaturated aldehydes which may be utilized to produce the unsaturated ether-aldehydes are acrolein, methacrolein, alpha-butylacrolein, alpha-ethylacrolein, alpha-propylacrolein, and the like. Unsaturated alcohols that may be condensed with these unsaturated aldehydes are exemplified by allyl alcohol, methallyl alcohol, ethyllyl alcohol, 2-butyl-2-propenol, 3-butenol, and 2-pentyl-2-propenol, and the like. Condensation catalysts that may be employed in this preparation comprise any of the known catalysts, such as sulfuric acid, hydrochloric acid, phosphoric acid, zinc chloride, aluminum sulfate, sodium acid sulfate, sodium hydroxide, sodium carbonates, ammonia, and organic amines. Amounts of catalyst varying from 0.01% to 5% by weight of the total reactants will usually be sufficient for this type of reaction. Temperatures employed during the condensation will vary from 0° C. to 100° C. or more depending upon the particular type of catalyst and particular reactants being employed. A more detailed description of this method of preparing the unsaturated ether-aldehydes is found in a copending application of Whetstone, Smith and Norton, Serial No. 16,616, filed March 23, 1948.

The carbonylic compounds to be condensed with the above-described unsaturated ethers of saturated aliphatic aldehydes are the saturated aldehydes and saturated ketones. Examples of the saturated aldehydes that are used in producing the novel condensation products are formaldehyde, acetaldehyde, propionaldehyde, butyraldehyde, isobutyraldehyde, valeraldehyde, isovaleraldehyde, crotonaldehyde, and the like, together with their homologues and suitable substitution products such as the halogenated aldehydes, etc. Representative saturated ketones include acetone, methyl ethyl ketone, methyl propyl ketone, methyl butyl ketone, methyl isobutyl ketone, cyclopentanone, cyclohexanone, and the like, together with their homologues, and suitable substitution products.

Substances which liberate the above-described carbonylic compounds, such as trioxane, paraformaldehyde, and metaldehyde, and the like may also be utilized.

The preferred carbonylic compounds to be used in producing the novel condensation products are the members of the group consisting of the saturated open-chain aldehydes containing from 1 to 5 carbon atoms and the saturated open-chain ketones containing from 3 to 9 carbon atoms. Examples of this preferred group of aldehydes are formaldehyde, acetaldehyde, propionaldehyde, isobutyraldehyde, and isovaleraldehyde. Examples of the preferred group of ketones are acetone, methyl ethyl ketone, methyl isobutyl ketone, dibutyl ketone, and the like.

In producing the novel condensation products a single saturated aldehyde or saturated ketone may be condensed with a single unsaturated ether-aldehyde, or a mixture of two or more of one or both reactants may be utilized. The unsaturated ether-aldehydes are preferably utilized in the condensation reaction in the monomeric form, however, partially polymerized unsaturated ether-aldehydes may be used if desired.

The condensation of the saturated aldehydes or ketones and the unsaturated ether-aldehydes may be accomplished by heating the reactants together in the presence of a condensation catalyst. Catalysts that may be employed in the reaction are exemplified by sulfuric acid, hydrochloric acid, phosphoric acid, selenic acid, etc., the acidic salts, such as zinc chloride, aluminum sulfate, stannous chloride, sodium acid sulfate, sodium dihydrogen phosphate, the aryl sulfonic acids, alkaline catalysts, such as sodium hydroxide, potassium hydroxide, lithium hydroxide, the alkaline earth metal hydroxides, including calcium, strontium, and barium hydroxides, the alkali metal carbonates and the alkaline earth metal carbonates, ammonia, and organic amines. The alkaline condensation catalysts are the more preferred. The amount of the condensation catalyst employed will vary depending on the type of catalyst but in general will vary from 0.1% to 5% by weight of total reactants with a preferred amount varying from 0.1% to 2% by weight.

In general, heat is evolved by the reaction so that a means of cooling the reaction mixture may be used if it is desired to conduct the reaction at constant temperature. The cooling may be accomplished, for example, by circulating cold material through coils in the reaction vessel or the reaction vessel may be be immersed in a cooling bath. Adding the unsaturated ether-aldehyde in only small quantities over a period of time is helpful in maintaining the mixture at a constant temperature.

The temperature employed during the condensation reaction may vary over a considerable range depending upon the type and quantity of catalyst, the particular reactants, and the type of product desired. In general, temperatures up to the boiling point of the reaction mixture may be utilized. Lower temperatures may be used if desired. The aldehydes are usually more reactive than the ketones and it is generally desirable to utilize lower temperatures when the aldehydes are to be condensed with the unsaturated ether-aldehydes. Preferred temperatures range from about 20° C. to 150° C. with a more preferred range varying from 50° C. to 85° C. Conducting the reaction under atmospheric pressure is usually more desirable although when conditions make it advantageous, superatmospheric or subatmospheric pressures may be used.

The quantities of reactants to be employed in producing the novel condensation products will vary over a considerable range depending upon the type of product desired. In general, the unsaturated ether-aldehydes and carbonylic compounds may be reacted in a molar ratio varying from 2:1 to 1:5, respectively. Exceptionally fine products are obtained when the mole ratio of unsaturated ether-aldehydes to carbonylic compounds is maintained between 1:1 and 1:4.

The condensation reaction may be conducted in the presence or absence of solvents or diluents. The solvent if employed may be a solvent for the reactants and condensation product or a solvent for the reactants and a non-solvent for the condensation product. Suitable solvents include toluene, dioxane, hexane, benzene, and mixtures thereof.

The water formed during the condensation reaction may be removed during or at the completion of the said reaction. The preferred method of removing the water is by simple distillation or by azeotropic distillation. The reactants are convenient substances for use in the azeotropic removal of the water. Thus the ketones, with the exception of acetone, form azeotropes with water and when they are condensed in the process, a sufficient excess may be added to the reaction mixture to enable the water which it is desired to remove to be taken from the mixture as an azeotrope with the ketone. If desired, other inert organic substances which form azeotropes with water may be employed. Suitable materials for this purpose are hydrocarbons such as benzene, toluene, isooctane, naphtha, etc. halogenated hydrocarbons, ethers, alcohols, and the like.

At the conclusion of the reaction the condensation products may be recovered in a variety of methods obvious to those skilled in the art such as solvent extraction, filtration, fractional distillation, and the like.

The condensation products of the invention will vary from viscous liquids to solids depending upon the type and proportion of reactants employed. The said products possess many unusual properties which enable them to be used for commercial purposes described hereinabove, such as plasticizers, tackifiers, textile lubricants, and the like.

The novel condensation products may also be polymerized with themselves or with other polymerizable unsaturated organic compounds to produce valuable polymeric materials. The products may be polymerized in the form in which they are obtained from the above-described condensation reaction or they may be first treated with modifying agents, such as dibasic acids, which may react with any free hydroxyl groups present in the said condensation product. A single condensation product or its modified form may be polymerized by itself, with a different condensation product of the invention, or with another type of polymerizable organic compound, e. g. those polymerizable compounds containing at least one $CH_2=C<$ group in their molecule, such as methyl methacrylate, vinyl chloride, acrylonitrile, methacrylonitrile, vinyl acetate, vinyl caproate, allyl acetate, diallyl phthalate, and the like.

The polymers of the novel condensation products may be prepared by any suitable method. They are preferably prepared, however, by heating the desired components together in the presence of a polymerization catalyst. Catalysts that may be employed for the polymerization may be exemplified by benzoyl peroxide, acetyl peroxide, sodium peroxide, barium peroxide, peracetic acid, perphthalic acid, potassium persulfate, and tertiary butyl hydroperoxide. The amount of the catalyst employed will usually vary between 0.1% to 5% by weight of the material being polymerized.

Temperatures employed during the polymerization reaction will vary over a considerable range but will generally range from about 50° C. to about 200° C. Preferred temperatures range from 100° C. to 150° C. Atmospheric, subatmospheric or superatmospheric pressures may be employed as desired.

The polymerization may be carried to completion without substantial interruption or it may be stopped at any point short of completion. Incomplete polymerization may be used for producing products which may be further worked and eventually completely polymerized. The product may, for example, be transferred to a mold of any desired configuration and again subjected to the polymerization process.

If desired, the polymer and copolymer of the invention may be modified by the addition of various modifying substances. Such modifying agents include the conventional plasticizers, stabilizers, lubricants, dyes, pigments and millers, such as asbestos, sand, clay, talc, mica, wood flour, cotton, shellac, copal, camphor, naphthalene, anthracene, dioctyl phthalate, dibutyl phthalate, tricresyl phosphate, and the like. An important group of modifiers consists of the organic plastic substances, such as protein plastics, phenol-aldehyde condensation products, vinyl-type addition products, such as polystyrene, polyvinyl chloride, polyvinylidene chloride, polymethyl methacrylate, polymethacrylonitrile, and the like.

The polymers of the invention are suitable for use in a variety of commerical applications. They may be employed, for example, in the preparation of various surface coating compositions, such as enamels, paints, lacquers, etc., in the preparation of laminating and impregnating compositions, in the production of molded articles of various shapes, etc.

To illustrate the manner in which the invention may be carried out the following examples are cited. It is to be understood, however, that the examples are for the purpose of illustration only and are not to be regarded as limiting the invention in any way.

Example I

A condensation product of beta-allyloxypropionaldehyde and formaldehyde was prepared by adding about .5 mole of the unsaturated etheraldehyde to .5 mole of potassium hydroxide and 2.5 moles of formalin in 300 parts of ethanol. This mixture was maintained for 45 minutes at 50° C. and then refluxed. The water formed during the reaction and the ethanol were removed and the residue extracted with hot ethanol. The condensation product was removed from this solution by distillation and appeared as a pale yellow syrup.

Example II

Approximately equal molar quantities of formaldehyde (37% formalin) and allyloxypropionaldehyde were combined in the presence of a small amount of aqueous sodium hydroxide. After a slightly exothermic reaction the solution was refluxed (95° C.) for several hours and then dehydrated for 3 hours at 150° C. under a stream of carbon dioxide. The resulting product was an amber-colored solid.

Example III

Beta - allyloxypropionaldehyde (.5 mole) is added to a stirred mixture of .5 mole of sodium hydroxide and .75 mole of acetone. The mixture is maintained at 75° C. for a short period of time and then refluxed. The water formed during the reaction is removed and the residue extracted with hot ethanol. The condensation product is recovered as a viscous liquid.

Example IV

About .5 mole of beta-methallyloxyisobutyraldehyde is added to a stirred mixture of .5 mole of sodium hydroxide and 2.5 moles of formalin in 300 parts of ethanol. The mixture is maintained at 50° C. for a short period and then refluxed. The water formed during the reaction and the ethanol are removed and the residue extracted with hot ethanol. A viscous liquid condensation product is obtained from this mixture by distillation.

Example V

About .5 mole of beta-methallyloxybutyraldehyde is added to a stirred mixture of .5 mole of sodium hydroxide and 1 mole of glyoxal in 300 parts of water. The mixture is maintained at 50° C. for a short period and then refluxed until the reaction appears to be complete. The condensation product is recovered from this solution by distillation.

Example VI

About .5 mole of beta-allyloxyisobutyraldehyde is added to a stirred mixture of .5 mole of sodium hydroxide and .5 mole of methyl butyl ketone. The mixture is maintained at 50° C. for a short period of time and then refluxed. The water formed during the reaction is removed and the residue extracted. A viscous liquid condensation product is obtained from this mixture by distillation.

Example VII

The condensation product of beta-allyloxypropionaldehyde and acetone produced in Example II is heated at 65° C. in the presence of 2% benzoyl peroxide. The product obtained is a resin possessing a hard attractive looking surface.

Example VIII

About 50 parts of the condensation product of methallyloxyisobutyraldehyde and formaldehyde produced in Example III is added to 50 parts of vinyl acetate and 2% by weight of benzoyl peroxide and the resulting mixture heated at 65° C. The resulting product is a hard resin having an attractive surface.

We claim as our invention:

1. A process comprising reacting beta-allyloxypropionaldehyde with formaldehyde in a mole ratio between 1:1 and 1:4 in the presence of an alkaline condensation catalyst at a temperature between 20° and 150° C.

2. A process comprising reacting beta-allyloxypropionaldehyde with acetone in a mole ratio between 1:1 and 1:4 in the presence of an alkaline condensation catalyst at a temperature between 20° C. and 150° C.

3. A process comprising reacting beta-methallyloxyisobutyraldehyde with formaldehyde in a mole ratio between 1:1 and 1:4 in the presence of a condensation catalyst at a temperature between 20° C. and 150° C.

4. A condensation product obtained by condensing beta-allyloxypropionaldehyde with formaldehyde in a mole ratio between 1:1 and 1:4 in the presence of an alkaline condensation catalyst.

5. A condensation product obtained by condensing beta-allyloxypropionaldehyde with acetone in a mole ratio between 1:1 and 1:4 in the presence of an alkaline condensation catalyst.

6. A condensation product obtained by condensing beta-methallyloxyisobutyraldehyde with formaldehyde in a mole ratio between 1:1 and 1:4 in the presence of an alkaline condensation catalyst.

7. A polymer of the condensation product defined in claim 4.

8. A polymer of the condensation product defined in claim 5.

9. A polymer of the condensation product defined in claim 6.

10. A process comprising reacting a saturated aliphatic aldehyde having one of its chain carbon atoms joined through an ether linkage to an open chain aliphatic unsaturated hydrocarbon radical containing one olefinic double bond in the beta,gamma position relative to the said ether linkage, with an approximate equal molar quantity of formaldehyde in the presence of an alkaline condensation catalyst at a temperature between 20° C. and 150° C.

11. A process comprising reacting at least one saturated aliphatic aldehyde having one of its chain carbon atoms joined through an ether linkage to an open chain aliphatic unsaturated hydrocarbon radical containing an olefinic double bond, with a carbonylic compound of the group consisting of saturated aldehydes and saturated ketones in a mole ratio between 2:1 and 1:5, in the presence of an alkaline condensation catalyst at a temperature below the boiling point of the reaction mixture.

12. A process comprising reacting at least one saturated aliphatic aldehyde having one of its chain carbon atoms joined through an ether linkage to an open chain aliphatic unsaturated hydrocarbon radical containing an olefinic double bond, with a carbonylic compound of the group consisting of saturated aldehydes and saturated ketones in the presence of a condensation catalyst.

13. A condensation product obtained by condensing a saturated aliphatic aldehyde having one of its chain carbon atoms joined through an ether linkage to an open chain aliphatic unsaturated hydrocarbon radical containing one olefinic double bond in the beta,gamma position relative to the said ether linkage, with an approximate equal molar quantity of formaldehyde in the presence of an alkaline condensation catalyst.

14. A condensation product obtained by condensing at least one saturated aliphatic aldehyde having one of its chain carbon atoms joined through an ether linkage to an open chain aliphatic unsaturated hydrocarbon radical containing an olefinic double bond, with a carbonylic compound of the group consisting of saturated aldehydes and saturated ketones in a mole ratio between 2:1 and 1:5, in the presence of an alkaline condensation catalyst.

15. A condensation product obtained by condensing at least one saturated aliphatic aldehyde having one of its chain carbon atoms joined through an ether linkage to an open chain aliphatic unsaturated hydrocarbon radical containing an olefinic double bond, with a carbonylic compound of the group consisting of saturated aldehydes and saturated ketones.

16. A polymer of the condensation product defined in claim 13.

17. A polymer of the condensation product defined in claim 15.

18. A condensation product obtained by condensing an alkenyl-oxy-substituted alkanal with formaldehyde in a mole ratio of between 1:1 and 1:4 in the presence of an alkaline condensation catalyst.

19. A condensation product obtained by condensing an alkenyl-oxy-substituted alkanal with a carbonylic compound of the group consisting of saturated aldehydes and saturated ketones in a mole ratio between 2:1 and 1:5 in the presence of an alkaline condensation catalyst.

20. A condensation product obtained by condensing a saturated aliphatic aldehyde having one of its chain carbon atoms joined through an ether linkage to a radical of the group consisting of hydrocarbon radicals containing an olefinic double bond and halogen-substituted hydrocarbon radicals containing an olefinic double bond, with a carbonylic compound of the group consisting of saturated aldehydes and saturated ketones in a mole ratio between 2:1 and 1:5 in the presence of an alkaline condensation catalyst.

21. A polymer of the condensation product defined in claim 20.

PAUL A. DEVLIN.
RICHARD R. WHETSTONE.
EDWARD C. SHOKAL.

REFERENCES CITED

The following references are of record in the file of this patent:

UNITED STATES PATENTS

| Number | Name | Date |
|---|---|---|
| 2,307,934 | Loder | Jan. 11, 1943 |